Jan. 19, 1926.                                                    1,570,107
L. H. WALSH
CIRCUIT CONTROLLING MEANS FOR SIGNALING DEVICES
Filed June 20, 1923        2 Sheets-Sheet 1
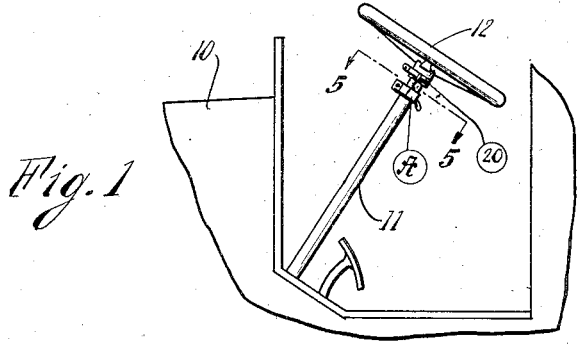
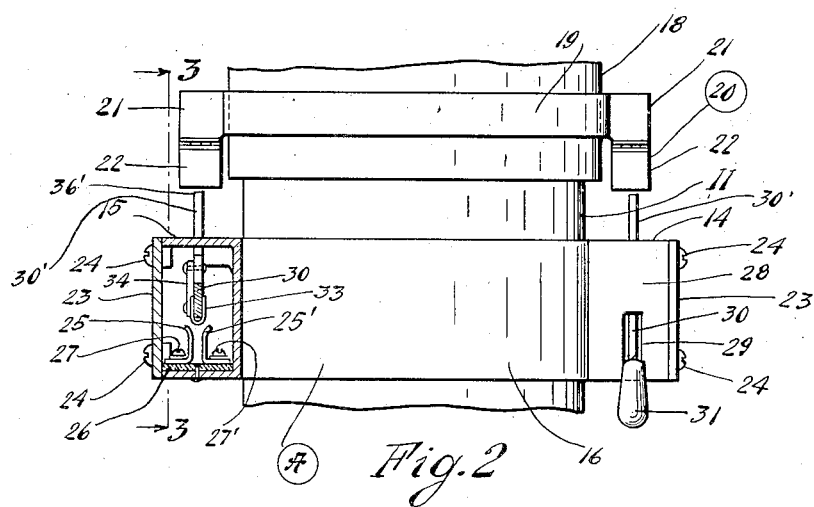
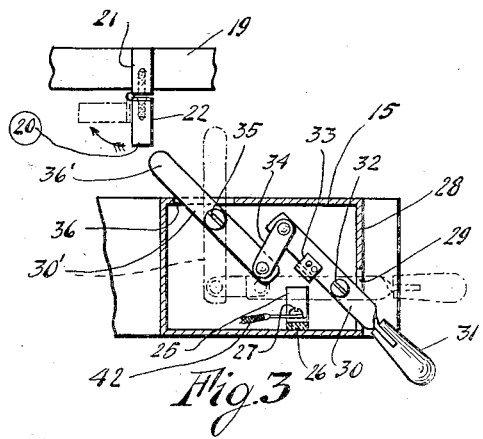
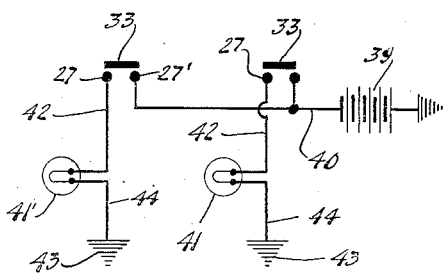
Witnesses:
Inventor:
Lawrence H. Walsh
By Joshua R. H. Gott
His Attorney

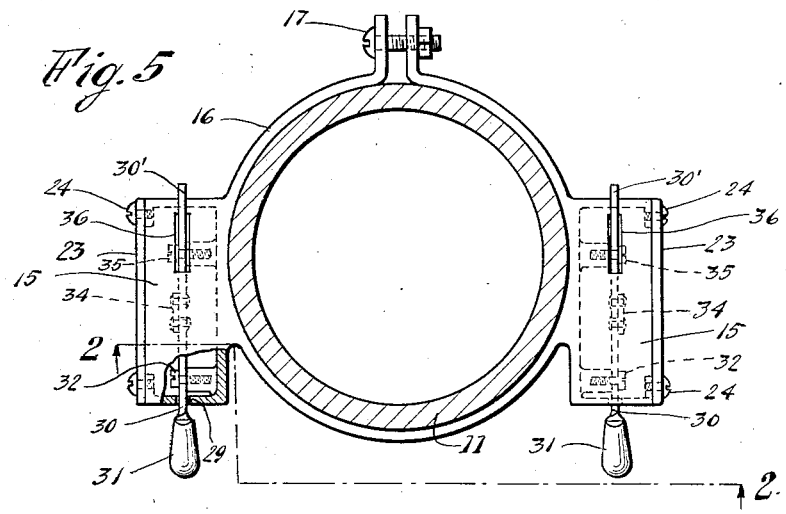
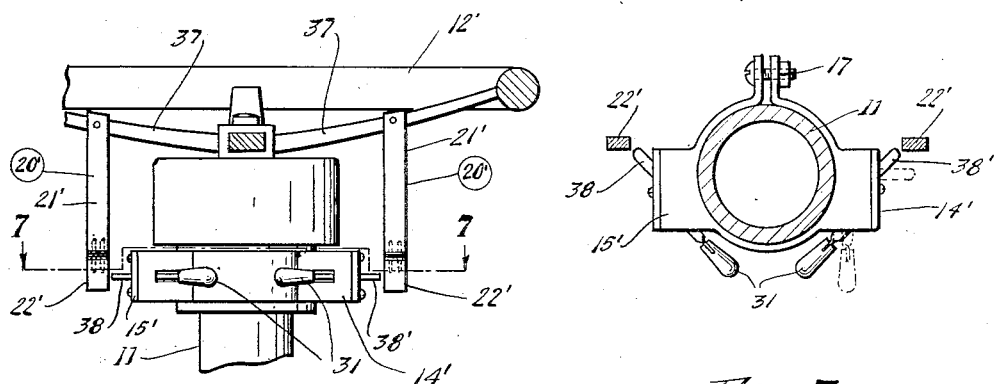

Patented Jan. 19, 1926.

1,570,107

UNITED STATES PATENT OFFICE.

LAWRENCE H. WALSH, OF CHICAGO, ILLINOIS.

CIRCUIT-CONTROLLING MEANS FOR SIGNALING DEVICES.

Application filed June 20, 1923. Serial No. 646,708.

*To all whom it may concern:*

Be it known that I, LAWRENCE H. WALSH, a citizen of the United States, and a resident of the city of Chicago, county of Cook, and State of Illinois, have invented certain new and useful Improvements in Circuit-Controlling Means for Signaling Devices, of which the following is a specification.

My invention relates to circuit controlling means for signaling devices, and has for its principal object the provision of an improved construction of this character, which will be highly efficient in use.

A further object of the invention is to provide circuit controlling means adapted to be mounted on a steering column of a vehicle an appreciable distance below the steering wheel and having certain parts for engagement with elements carried by the wheel to manipulate the circuit controlling means upon movement of the steering wheel to make a left or right turn of the vehicle.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevational view of a steering column and steering wheel showing the invention associated therewith;

Fig. 2 is an enlarged fragmentary view of the steering column showing the invention associated therewith and showing one of the switch boxes embodied in the invention in section to better illustrate the interior thereof;

Fig. 3 is a sectional view taken substantially on line 3—3 of Fig. 2;

Fig. 4 is a diagrammatical view of the circuit system embodied in the invention;

Fig. 5 is a sectional view taken substantially on line 5—5 of Fig. 1;

Fig. 6 is a fragmentary view of a steering column and steering wheel showing a slightly modified form of construction of the circuit controlling means embodying the invention, and Fig. 7 is a sectional view taken substantially on line 7—7 of Fig. 6.

Referring to the drawings and especially to Fig. 1, 10 indicates the body of a vehicle, 11 the steering column, 12 the steering wheel and A the circuit controlling means embodying the invention.

Referring to Fig. 2 showing the preferred form of construction, the steering column 11 carries on opposite sides thereof switch boxes 14 and 15 by means of a collar 16 adapted to be clamped around the steering column and h... in such clamped position by a nut receiving bolt 17. The steering arrangement of most improved cars includes an enlarged portion indicated at 18, which is usually beneath the steering wheel 12 and movable therewith, and fixed to the steering rod. To this enlarged portion 18 I clamp a collar 19 which carries at opposite sides trip fingers 20 in the form of toggle joints consisting of parts 21 and 22, the parts 22 being adapted to pivot only through an arc to the left of the pivot connection as indicated by the arrow, Fig. 3. for reasons to be more fully hereinafter understood.

The switch box 15 includes a removable wall portion 23 fixed in closed position by means of machine screws 24. Within the switch box 15 is arranged adjacent contact elements 25 and 25' formed of resilient material and in spaced relation with respect to each other and insulated from the switch box by a base 26 of suitable non-conducting material and provided with terminal screws 27 and 27' to which the circuit wires are connected.

The rear wall 28 of the switch box, at its lower portion, has a slot 29 formed therein through which is taken a lever 30 having an operating handle at one end and a pivot point within the housing as indicated at 32. The lever 30 carries a contact element 33 which is adapted when the lever is moved about its pivot in a downward direction to pass between the contact elements 25 and 25' and connect these elements in circuit. The inner end of the lever 30 is connected to a lever 30' by means of a link 34 and the lever 30' has a pivot connection within the housing as at 35 and has an end portion 36' extending exterior of the housing through a slot 36. When the lever 36 is in a vertical position as that indicated in dotted lines, Fig. 3, it is adapted to be engaged by the adjacent part 22 of the trip 20 upon turning movement of the steering wheel in a direction to bring such part into engagement with the exterior end 36' of the lever 30'. By reason of the fact that the part 22 can pivot in a direction indicated by the arrow, Fig. 3, the part will pass over the end 36' without moving the lever 30 or 30'. But upon movement of the steering wheel in the opposite direction the part 22 being prevented from pivotal movement through an arc to the right of the pivot connection the adjacent part 22 operatively engages the exterior end 36' and during movement of the steering wheel the lever 30' is moved in the position illustrated in full lines, Fig. 3, and as this lever moves in such position the lever 30 is moved in the position illustrated in full lines in that figure and the contact element 33 is brought out of engagement with the contact elements 25 and 25'.

To move the contact element 33 into contact with the contact elements 25 and 25' to make a circuit the driver of the vehicle manipulates the lever 30 by grasping the handle 31' and pivoting the lever 30 in the direction to bring this contact element into contact with the contact elements 25 and 25'. Usually this is done shortly before the driver reaches the point where he desires to turn. The reason for this is that by setting the signal others are notified of his intention to make a turn. The breaking of the circuit after making the turn is accomplished in the manner above described by means of the part 22 pivoting the lever 30' upon turning of the wheel to steer the vehicle in a straight line.

While I have described the construction of the switch box 15, it is intended that the construction of the switch box 14 be substantially the same as the switch box 15, and the parts making up the same are operated in substantially the same manner as the parts making up the switch box 15.

Referring to Fig. 6 showing the modified form of construction the combination and arrangement of parts embodied in this modification are designed especially to be used in connection with vehicles where it is impossible to clamp the collar 19 in the position illustrated in Fig. 2 by reason of the fact that certain styles of steering wheels have locks or other combinations of parts arranged under the steering wheel. The construction involved in this modification is substantially the same as the construction involved in the circuit controlling means above described, especially with reference to the switch boxes and the parts associated therewith, with the exception of certain parts which will hereinafter be referred to. It will be noted that instead of providing the collar 19 the trips 20' are secured to the spokes 37 of the steering wheel 12'. These trips 20' also comprise parts 21' and 22' arranged to function substantially the same as the parts of the trips 20. The parts 22' are adapted to pass in spaced relation with respect to the adjacent side walls of the switch boxes 15' and 14' and the levers 38 and 38' project outwardly through the side walls of the housing for engagement with the parts 22' of the trips. The other parts and elements embodying the switches are substantially the same as those indicated and described with reference to the circuit controlling means A and are indicated by the same reference numerals.

In Fig. 4 I have shown a diagrammatical view of the circuit system and the system includes a suitable source of supply indicated at 39 having a main conductor 40 which is connected to the contact elements 27'. The contact elements 27 are connected to the lamps 41 and 41' by conductors 42 and the lamps are grounded to the body of the vehicle as at 43 by conductors 44. These lamps 41 and 41' are preferably encased in suitable housings each having on its rear face the word "Right" or "Left" and one located on the left side of the vehicle and the other located on the right side of the vehicle.

From the description above referring to the operation and construction embodying the circuit controlling means, it will be seen that I provide an arrangement and combination of parts which can be economically manufactured and which will prove to be highly efficient in use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A signal control switch for vehicle steering mechanism including a support on the steering post; a finger arranged to move with the steering rod; a circuit closing member on the post; an operating lever connected for actuating the circuit closing member; and a hinged trip part carried by said finger for interlocking with the operating lever and finger when the steering rod is moved in one direction.

2. A signal control switch for vehicle steering mechanism including a support on the steering post; a finger arranged to move with the steering rod; a circuit closing member and an operating lever each pivoted to said support; a link connecting the circuit closing member with the operating lever; a handle on the circuit closing member for actuating the same; and a hinged trip part carried by said finger for interlocking with the operating lever and finger when the steering rod is moved in one direction.

In testimony whereof I have signed my name to this specification.

LAWRENCE H. WALSH.